United States Patent
Whitton

(10) Patent No.: US 6,172,964 B1
(45) Date of Patent: Jan. 9, 2001

(54) CLOCK SYNCHRONIZATION

(75) Inventor: Robert Allan Whitton, Luewknor (GB)

(73) Assignee: Madge Networks Limited, Buckinghamshire (GB)

(*) Notice: Under 35 U.S.C. 154(b), the term of this patent shall be extended for 0 days.

(21) Appl. No.: 08/775,297

(22) Filed: Dec. 31, 1996

(30) Foreign Application Priority Data

Jan. 24, 1996 (GB) .................................................. 9601348

(51) Int. Cl.[7] .................................................... H04J 3/14
(52) U.S. Cl. .......................................... 370/230; 370/395
(58) Field of Search ...................................... 370/230, 229, 370/231, 232, 233, 234, 235, 395, 396, 398, 463, 419; 395/200.3, 200.62, 200.63, 200.64, 200.65, 872, 873, 877, 880; 377/66, 67, 52

(56) References Cited

U.S. PATENT DOCUMENTS

| | | | |
|---|---|---|---|
| 4,613,954 | * | 9/1986 | Sheth ...................................... 395/877 |
| 5,007,070 | * | 4/1991 | Chao et al. . | |
| 5,249,271 | * | 9/1993 | Hopkinson et al. .................. 395/877 |
| 5,274,680 | * | 12/1993 | Sorton et al. ......................... 370/253 |
| 5,390,299 | * | 2/1995 | Rege ..................................... 395/877 |
| 5,488,646 | * | 1/1996 | Jones et al. ............................. 377/47 |
| 5,513,326 | * | 4/1996 | Nute ..................................... 395/880 |
| 5,604,866 | * | 2/1997 | Kolb et al. ............................ 395/877 |
| 5,717,591 | * | 2/1998 | Dighe et al. .......................... 370/463 |
| 5,778,218 | * | 7/1998 | Gulick . | |
| 5,864,747 | * | 1/1999 | Clark et al. . | |

* cited by examiner

Primary Examiner—Huy D. Vu
(74) Attorney, Agent, or Firm—Sughrue, Mion, Zinn, Macpeak & Seas, PLLC

(57) ABSTRACT

A network interface for an asynchronous cell switched communication network includes a data input, a memory for buffering data received at the data input, and a clock signal generator for providing a clock signal having a frequency which is controlled in accordance with a fill level of the buffer memory. The clock signal is used to control a rate of transfer of data from the buffer memory. Data received at the network interface device is consumed by a buffer, typically a FIFO device. When the buffer fill level exceeds a predetermined level, the clock signal frequency is increased and conversely, when the buffer fill level drops below the predetermined level, the clock signal frequency is decreased.

16 Claims, 2 Drawing Sheets

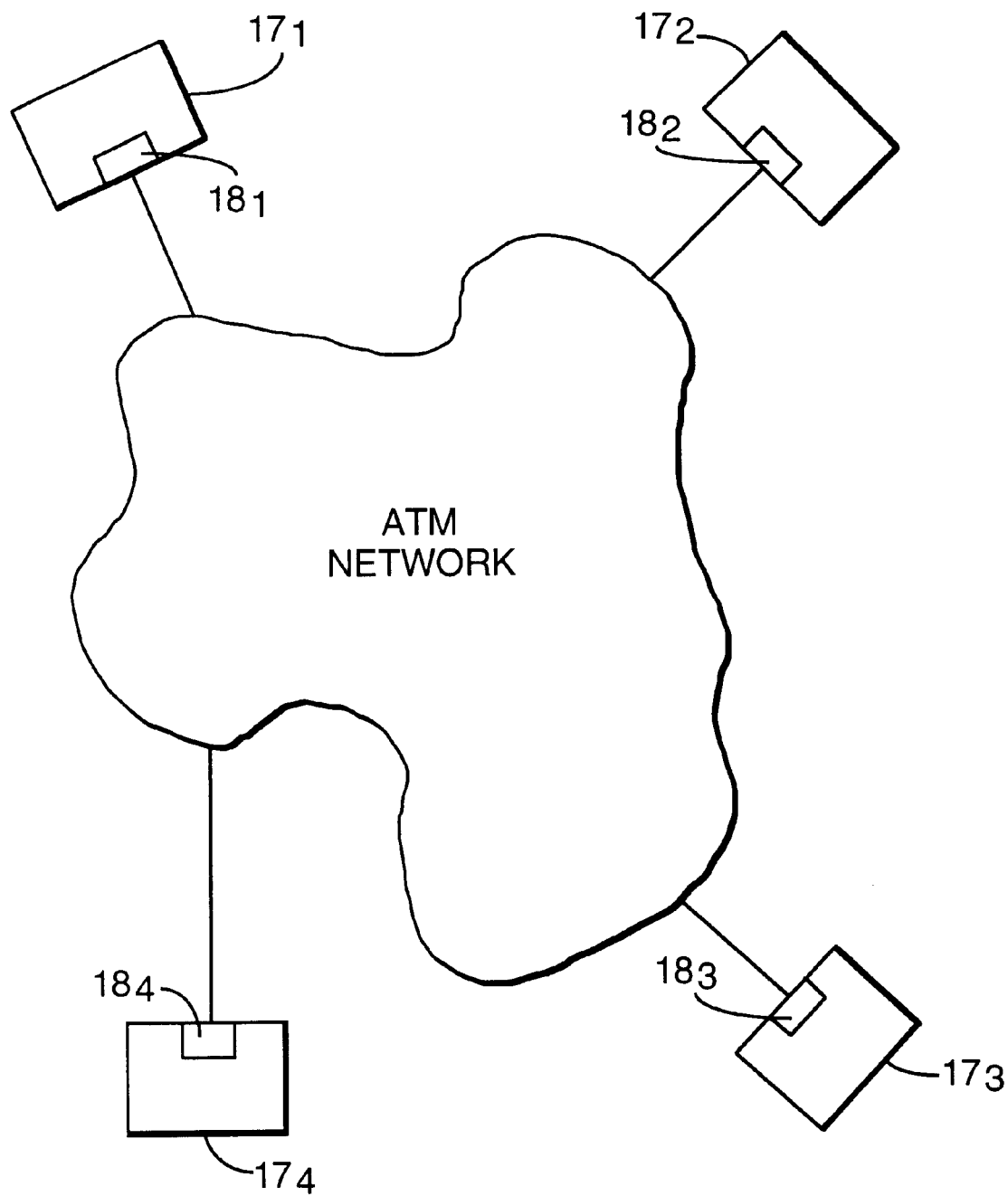

CLOCK SYNCHRONIZATION

FIELD OF THE INVENTION

An important issue in the design of an asynchronous communication network such as an Asynchronous Transfer Mode (ATM) network is synchronisation of the network. If the network is to be able to handle any traffic type that is inherently synchronous then it is necessary to provide end-to-end network clock synchronisation. This is not the same as the synchronisation used within a PSTN network or within a TDM carrier structure. The parts of an ATM network that need to be synchronised are external input and output interfaces. An ATM network does not necessarily support global clock distribution. Data transfer within the ATM network itself is asynchronous.

In ATM, traffic types that require this level of synchronisation are the Constant Bit Rate (CBR) service, voice, video, and multi-media.

A problem facing network designers is that in the absence of global clock distribution it is not possible to manufacture timing sources, other than extremely expensive atomic clocks, that provide highly accurate timing. Crystal controlled oscillators are used in most communications equipment and they are generally accurate to about fifty to one hundred parts in a million. This is not accurate enough to maintain synchronisation.

In PSTN telephone networks, extreme care is taken to synchronise the entire network to the same clock. Atomic clocks are situated at critical points within the network and timing is then propagated throughout the network along with the data. In contrast, in an ATM network, cell streams are not particularly time sensitive. Provided links are of sufficient capacity, there is no requirement in ATM to synchronise links between ATM switches. In ATM, it is only at external interfaces which are bit rate sensitive where there is a need to synchronise the data streams.

Clock synchronisation is a particular problem in the case of a connection of a PSTN telephone call across an ATM network and also in the case of two external interfaces attached to an ATM network which try to establish an 8 KHz telephone call.

SUMMARY OF THE INVENTION

In the present application, the term "cell" is used to define a fixed length data packet.

According to a first aspect of the present invention, a network interface device for an asynchronous cell switched communication network comprises:
   a data input;
   a memory for buffering data received at the data input; and,
   means for generating a clock signal having a frequency which is controlled in accordance with a fill level of the buffer memory, wherein the clock signal is used to control a rate of transfer of data from the buffer memory.

According to a second aspect of the present invention, in a network interface device for an asynchronous cell switched communication network, a method of generating a clock signal for handling data received at an input port buffer comprises the steps of monitoring a fill level of the buffer and generating a clock signal having a frequency which is varied in accordance with the fill level of the buffer, wherein the clock signal frequency is increased when the buffer fill level exceeds a predetermined fill level and the clock signal frequency is decreased when the buffer fill level drops below the predetermined fill level.

In the present invention, data received at a network interface device is consumed by a buffer, typically a FIFO device. When the buffer fill level exceeds a predetermined level, the clock signal frequency is increased and conversely, when the buffer fill level drops below the predetermined level, the clock signal frequency is decreased.

Preferably, the means for generating the clock signal comprises a counter which is controlled by a local clock source operating at a predetermined frequency.

Preferably, the counter is preloaded with a count value which is counted by the local clock until the counter overflows whereupon an overflow signal is generated which is used as the clock signal to control the rate at which data is consumed from the buffer memory. The counter is then reloaded so that the counter restarts.

Preferably, the network interface device further comprises a means to control a mark-space ratio of the clock signal.

Preferably, the buffer memory is initially set up so that it is substantially at the predetermined fill level. As the system runs, any difference between the local clock and the rate of data received at the buffer will be shown at the buffer fill level. Preferably, the count value is adjusted by a predetermined amount to control any mismatch. In particular, in the case of a down counter, if the buffer fill level is increasing, the preloaded count value is decreased by a predetermined value to increase the frequency of the clock signal. Conversely, if the buffer fill level is decreasing, the preloaded count value is increased to decrease the frequency of the clock signal.

Preferably, the clock signal is also used to control the transmission rate of data from a data output and an associated data output buffer.

Preferably, the asynchronous cell switched communication system is an ATM network.

BRIEF DESCRIPTION OF THE DRAWINGS

An example of the present invention will now be described with reference to the accompanying drawings, in which:

In FIG. 1, an ATM cell stream from an ATM network 1 is received at an input port 2 where the cells are initially processed in a data conditioning stage 3. In particular, the 5-byte cell headers are stripped off and examined. The ATM cells are then passed to an N-stage input FIFO 4 and thereafter to a local sink 5 comprising a digital to analogue converter. The analogue signal is then passed to a telephone (not shown) from output port 6 of the local sink 5.

Figure 1:
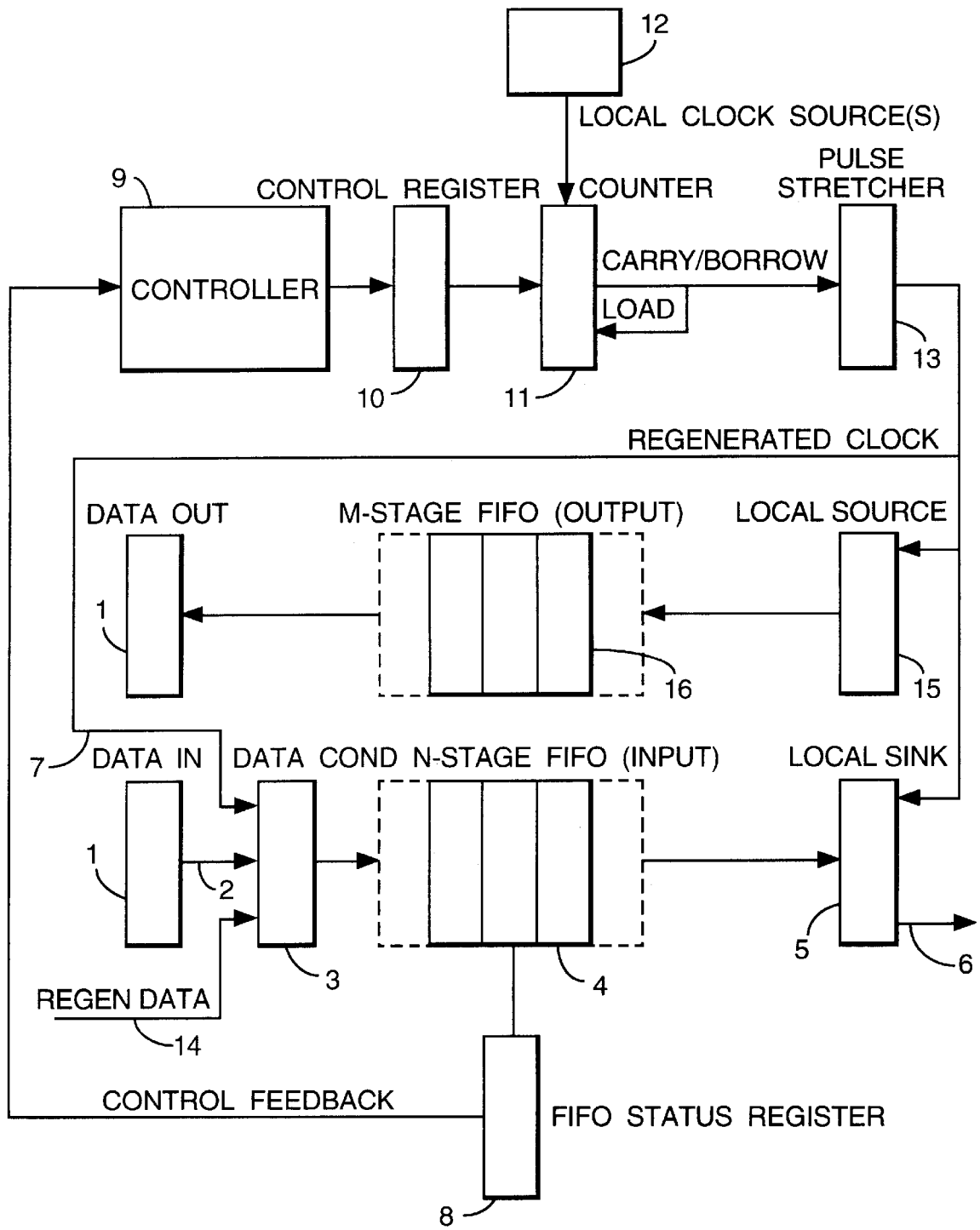
FIG. 1 shows an example of an ATM network interface device in accordance with the present invention; and, FIG. 2 shows a simplified ATM network incorporating the network device of FIG. 1.

ATM cells received from the network 1 are placed into the input FIFO 4. The input FIFO 4 includes a FIFO status register 8 which passes a buffer fill level value to a controller 9. The controller 9 generates a value to be specified in a control register 10 of a counter 11. The counter 11 is preloaded with the value specified in the control register 10 and proceeds to count from this value under the control of a local clock 12 until it overflows. At this point, the counter 11 is reloaded so that the count restarts. The overflow signal is used as a regenerated clock signal. At this point, the regenerated clock signal consists of a very short duration pulse. Whilst this is suitable for many applications, some systems require a longer pulse and therefore a pulse stretcher 13 is provided for this purpose.

The regenerated clock signal is used to control the rate at which the local sink 5 consumes data from the input FIFO 4. The input FIFO 4 is initially set up so that it is one cell short of an equilibrium fill level. The local clock is disabled until the first cell is received. The FIFO status register 8 indicates the amount of data in the input FIFO 4. As the system runs, any clock mismatch will be manifested in the buffer fill level of the input FIFO 4. The controller 9 examines the FIFO status just after each ATM cell is received and adjusts the value in the control register 10 so that the frequency of the regenerated clock is adjusted very slightly to compensate for the mismatch. As any clock mismatch can only cause data to be gained or lost at a limited rate, it is not generally necessary to examine the buffer fill level after each ATM cell is received.

The counter 11 may be of the up or down variety according to the desired implementation. When using a down counter, the control register 10 should be loaded with (N−1), where N is the desired division between the local and regenerated clock signals. When using an up counter, the control register 10 should be loaded with the twos complement of N. This assumes that a borrow-carry signal is generated when the count goes to zero or all ones, respectively.

For implementation in an ATM network, the minimum total length of the input FIFO 4 in the input data path is the size of an ATM cell plus an additional number of stages required to correct for a worse case cell delay variation (CDV) plus an implementation dependent number of stages of clock regeneration buffer. A typical input FIFO 4 will be a 64-stage buffer. Input FIFO 4 is initialised by stopping the local sink 5, applying data to a data input 14 and clocking in sufficient samples of ATM cells to fill the input FIFO 4 to an equilibrium level less one ATM cell size. As soon as the first ATM cell is received at the FIFO 4, the FIFO 4 will be filled to its equilibrium level and the local sink 5 is restarted. The regenerated clock input 7 and regenerated data input 4 are used to maintain clock synchronisation in the event of missing data.

The network interface also comprises a local source 15 connected to a M-stage output FIFO 16. The output FIFO 16 is in turn connected to the ATM network 1. The output FIFO 16 is the size of one ATM cell so that a complete ATM cell is transmitted as soon as the output FIFO 16 becomes full.

In normal operation, at equilibrium the fill level of the input FIFO 4 will vary between a known upper and lower limit determined by the amount of cell delay variation. When these levels are breached, it is an indication to the controller 9 that an adjustment to the regenerated clock is required. The maximum rate at which samples may be gained and lost may be calculated from a knowledge of the accuracy of the clocks in the system. This allows the rate of frequency jitter to be minimised by holding off any clock adjustment until just before it would be possible to accumulate or lose another sample.

By adjusting the value in the control register 10 a whole series of regenerated clocks may be selected. To support systems that require multiple regenerated clocks that are not factors of a common local clock, a simple switch may be made between any one of a number of local clocks.

FIG. 2 shows a simplified ATM network having end stations $17_1$ to $17_4$ connected to the network. Each end station 17 includes a network interface device 18 in accordance with the present invention for generating a clock signal to control the processing of ATM cells received at the end station.

EXAMPLE

Consider an example of interworking with a PSTN that provides a highly accurate 8 KHz data rate. The local clock 12 in the network device is 12.288 MHz and using a down counter 11, the control register 10 is loaded with the value "1535". This will give a regenerated clock signal at a nominal 8 KHz rate. If the local clock 12 is accurate to 100 ppm and it is assumed that the other party to the connection is a PSTN with a virtually 100% accurate clock then it will take 1.25 seconds to accumulate or lose a sample in the input FIFO 4. The controller 9 examines the input FIFO 4 status more frequently than this and modifies the value in the control register 10 accordingly. A modification of ±1 in the control register 10 will give a change in local clock of 1000000/1536 and a frequency change of data representing 1 Khz of 0.651 Hz, which is 651 ppm. This will rapidly correct the fill level in the FIFO 4 and the controller 9 will then set the control register 10 back to "1535".

The system may be made more accurate by choosing a local clock with a higher frequency. For example, choosing a clock of 49.152 MHz will require a control register value of "6143". Adjusting this value by one will give a 163 ppm change in the regenerated clock and a frequency change at 1 KHz of 0.163 Hz. The rate at which the system jitters between frequencies can be reduced by using a local oscillator with a higher accuracy, holding off the adjustment until the latest possible time, and increasing the length of the input FIFO. At a high local clock frequency that offers poor accuracy it may not be sufficient for the control register to have its value adjusted by ±1.

The control register 10 could have its value adjusted by a figure greater than ±1 although this will introduce a succession of small amounts of frequency jitter as perceived by a user. A better approach is to use a longer input FIFO 4 as this will allow the controller to use larger adjustments and will thus allow a much finer control.

What is claimed is:

1. A network interface device for an asynchronous cell switched communication network comprising:

a data input;

a memory for buffering data received at said data input; and, means for generating a clock signal having a frequency which is controlled in accordance with a fill level of said buffer memory, wherein said frequency of said clock signal is increased when said buffer fill level exceeds a predetermined level, and said frequency of said clock signal is decreased when said buffer fill level drops below a predetermined level, wherein said clock signal is used to control a rate of transfer of data from said buffer memory, in which said means for generating said clock signal comprises a counter controlled by a local clock source operating at a predetermined frequency.

2. A device according to claim 1, further comprising a controller arranged to receive buffer memory fill level data and load a count value into said counter, said count value being varied in accordance with said buffer memory fill level data.

3. A device according to claim 1, further comprising a means to control a mark-space ratio of said clock signal.

4. A device according to claim 1, further comprising a data output and an associated data output buffer which are controlled by said clock signal.

5. A communication network including a network interface device, said network interface device comprising:
   a data input;
   a memory for buffering data received at said input; and
   means for generating a clock signal having a frequency which is controlled in accordance with a fill level of said buffer memory, wherein said clock signal frequency is increased when said buffer fill level exceeds a predetermined level and said clock signal frequency is decreased when said buffer fill level drops below a predetermined level, wherein said clock signal is used to control a rate of transfer of data from said buffer memory, in which
   said means for generating said clock signal comprises a counter controlled by a local clock source operating at a predetermined frequency.

6. A method of generating a clock signal for handling data received at an input port buffer of an interface device in an asynchronous cell switched communication network, comprising the steps of monitoring a fill level of said buffer and generating a clock signal having a frequency which is varied in accordance with said fill level of said buffer, wherein said clock signal frequency is increased when said buffer fill level exceeds a predetermined level and said clock signal frequency is decreased when said buffer fill level drops below a predetermined level, in which
   said clock signal is an overflow signal generated by a counter controlled by a local clock source operating at a predetermined frequency.

7. A method of generating a clock signal for handling data received at an input port buffer of an interface device in an asynchronous cell switched communication network, comprising the steps of monitoring a fill level of said buffer and generating a clock signal having a frequency which is varied in accordance with said fill level of said buffer, wherein said clock signal frequency is increased when said buffer fill level exceeds a predetermined level and said clock signal frequency is decreased when said buffer fill level drops below a predetermined level, in which
   said clock signal is an overflow signal generated by a counter controlled by a local clock source operating at a predetermined frequency, and in which
   a controller is provided to load said counter with a count value which is counted by said local clock until said counter overflows.

8. A method according to claim 7, in which said count value to be loaded into said counter is periodically updated by said controller to maintain said buffer fill level substantially at said predetermined fill level.

9. A method according to claim 8, wherein said counter is a down counter and said count value is decremented by a predetermined value to increase the frequency of said clock signal if said buffer fill level is detected to have exceeded said predetermined fill level and said count value is incremented by a predetermined value to decrease the frequency of said clock signal when said buffer fill level is detected to be below that of said predetermined fill level.

10. A method according to claim 6, in which said clock signal is also used to control transmission of data from a data output and an associated data output buffer.

11. A method according to claim 7, in which said clock signal is also used to control transmission of data from a data output and an associated data output buffer.

12. A method according to claim 8, in which said clock signal is also used to control transmission of data from a data output and an associated data output buffer.

13. A method according to claim 9, in which said clock signal is also used to control transmission of data from a data output and an associated data output buffer.

14. A device according to claim 5, further comprising a controller arranged to receive buffer memory fill level data and load a count value into said counter, said count value being varied in accordance with said buffer memory fill level data.

15. A device according to claim 5, further comprising a means to control a mark-space ratio of said clock signal.

16. A device according to claim 5, further comprising a data output and an associated data output buffer which are controlled by said clock signal.

* * * * *